United States Patent
Savoca et al.

(10) Patent No.: US 6,764,731 B2
(45) Date of Patent: Jul. 20, 2004

(54) PROCESS FOR THE PREPARATION OF A RUBBER ARTICLE HAVING AN OUTER POLYMER-COATED SURFACE AND AN INNER CHLORINATED SURFACE

(75) Inventors: Ann C. Savoca, Nazareth, PA (US); Zhixin Li, Bridgewater, NJ (US); Joseph B. Gardner, Somerville, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 7 days.

(21) Appl. No.: 10/053,838

(22) Filed: Jan. 22, 2002

(65) Prior Publication Data

US 2003/0138579 A1 Jul. 24, 2003

(51) Int. Cl.$^7$ .................................................. C08J 7/04
(52) U.S. Cl. ...................... 428/36.8; 428/492; 428/517; 428/519; 428/520
(58) Field of Search ............................... 428/36.8, 492, 428/517, 519, 520

(56) References Cited

U.S. PATENT DOCUMENTS

| | | | |
|---|---|---|---|
| 5,088,125 A | 2/1992 | Ansell et al. | 2/167 |
| 5,272,771 A | 12/1993 | Ansell et al. | 2/167 |
| 5,395,666 A | 3/1995 | Brindle | 429/36.4 |
| 5,534,350 A | 7/1996 | Liou | 428/423.1 |
| 5,663,245 A | 9/1997 | Kennedy et al. | 525/479 |
| 5,691,069 A | 11/1997 | Lee | 428/500 |
| 5,700,585 A | 12/1997 | Lee | 428/500 |
| 5,712,346 A | 1/1998 | Lee | 525/288 |

FOREIGN PATENT DOCUMENTS

| | | | |
|---|---|---|---|
| EP | 0 356 580 A2 | * | 3/1990 |
| EP | 1086 980 A1 | * | 3/2001 |
| GB | 1231683 | * | 5/1971 |

* cited by examiner

*Primary Examiner*—Sandra M. Nolan
(74) *Attorney, Agent, or Firm*—Thomas F. Roland

(57) ABSTRACT

The present invention is related to a two-side treated formed rubber article having a polymer coating on the outer surface; and a chlorinated inner surface. It is also related to a process for making gloves using a polymer as a mold release and anti-blocking agent on the outside of the glove, and a chlorination of the glove inside surface. The rubber article can be formed as a powder-free glove.

13 Claims, No Drawings

PROCESS FOR THE PREPARATION OF A RUBBER ARTICLE HAVING AN OUTER POLYMER-COATED SURFACE AND AN INNER CHLORINATED SURFACE

The present invention relates to a two-side treated rubber article having on its outside surface a polymer coating and having a chlorinated inner surface. The invention is also related to an in-line process for forming such an article, and in particular forming a latex glove.

BACKGROUND OF THE INVENTION

Rubber articles are elastomeric materials having low glass transition temperatures (Tg). Surfaces of the low Tg articles tend to stick together. In particular, in a rubber or latex glove, the inside of the glove must allow for good donning, while the outside of the glove (which is in contact with a former during manufacturing) must be able to be easily released from the former, and must not stick to other gloves when packaged (must have good anti-blocking properties). Both of these problems have been solved in the past by coating the inside and outside of a glove with a powder, such as starch, talc or calcium carbonate.

The powder coating is a known nuisance, as loose powder can become airborne. The powder tends to absorb proteins found in natural rubber latex and the powder is easily dislodged during donning and use, contaminating the surrounding environment and causing allergies and other negative effects. Further, the protein/powder complex serves as a food source for bacteria, allowing them to proliferate. Recently, there has been a growing demand for powder-free natural and synthetic rubber gloves, which do not use loose powder for donning and mold release.

One alternative to a powdered glove is a powder-free glove using chlorination of both the inner and outer surfaces to reduce the tack and friction of the rubber. An additional advantage of this process is a reduction in the protein level of the latex. A disadvantage is that the chlorination process makes the rubber less pliant, and reduces the shelf life of the glove. Chlorination of both surfaces of a glove is very labor intensive process, since the glove must be stripped from the former to chlorinate the outer surface.

Another method for producing a powder-free glove is the use of polymer coatings. Several types of polymer coatings have been developed, primarily based on polyurethanes: U.S. Pat. No. 5,088,125 discloses gloves modified by an ionic polyurethane; U.S. Pat. No. 5,272,771 discloses gloves modified by an ionic polyurethane containing fully reacted isocyanate groups; and U.S. Pat. No. 5,534,350 discloses gloves in which the outer glove coating contains a polyurethane dispersion and the inside glove coating contains a polyurethane containing a silicone emulsion.

Other coatings which have been developed include emulsion copolymers, particularly core-shell, containing low surface energy monomers and hard monomers as disclosed in U.S. Pat. Nos. 5,691,069 and 5,700,585; or containing two monomers selected from styrene, methyl or butyl acrylates, methacrylic or acrylic acid and a silicone oligomer, with glass transition temperatures of less than 0° C. and from 0 to 100° C. respectively as disclosed in U.S. Pat. No. 5,712,346. These sequential emulsion polymerizations lead to substantially linear copolymers. Copending U.S. patent application Ser. No. 09/400,488 describes the use of star polymers as coatings for latex gloves. Copending U.S. patent applications Ser. Nos. 09/663,468 and 09/882,222 describe polymer coatings and polymer mold release compositions useful for inner and outer glove coatings respectively, and are incorporated herein.

It has now been found that a continuous in-line process for two-side treated rubber articles, involving chlorination of the inner surface and a polymer-coated outer surface, advantageously combines the positive features of both technologies to produce a powder-free glove. An in-line outer coating process combined with off-line chlorination allows for chlorination to occur for extended time periods not limited by the line speed, and also allows chlorination to occur in a closed system to control chlorine emmisions.

SUMMARY OF THE INVENTION

The present invention is directed to a two-sided treated rubber article having a polymer coating on the outer surface, and a chlorinated inner surface.

The invention is also directed to a process for making a glove comprising
 a) immersing a glove former in a coagulant solution comprising a release composition comprising a polymer to produce a coated former;
 b) immersing the coated former into a rubber latex to coat the former with said latex;
 c) chlorinating the latex on the coated former;
 d) curing the chlorinated latex on the coated former; and
 e) removing the finished glove from the former.

The invention is further directed to a process for making a glove comprising
 a) immersing a glove former in a coagulant solution comprising a release composition comprising a polymer to produce a coated former;
 b) immersing the coated former into a rubber latex to coat the former with said latex;
 c) curing the latex on the coated former;
 d) chlorinating the latex on the coated former; and
 e) removing the finished glove from the former.

DETAILED DISCRIPTION OF THE INVENTION

The present invention is directed to two-sided treated rubber article having a polymer coating on the outer surface; and a chlorinated inner surface; and a process for producing said glove.

A rubber article, as used herein, refers to an article made of a natural or synthetic, low-Tg, elastomeric polymer or mixture of polymers. Examples of such polymeric materials include, but are not limited to, butyl rubber, natural latex rubber, polyvinyl chloride, neoprene, nitrile, viton, styrene butadiene copolymers, polyurethanes, or interpenetrating polymer network emulsion polymers, or combinations of these.

The polymer coating on the outer surface of the rubber article serves both as a mold-release agent and also as an anti-blocking agent. The polymer of the invention preferably has a Tg of greater than −10° C., preferably from 25 to 200° C. and most preferably from 40 to 150° C. For ease of use in a glove manufacturing process, the polymer should be water-borne.

A preferred polymer for the outer coating is a copolymer formed from at least one hydrophobic monomer. The polymer may, and preferably does, also contain at least one hydrophilic monomer, though a useful polymer may be formed without a hydrophilic monomer. Monomers useful in forming the polymer of the present invention are ethylenically unsaturated monomers or mixtures thereof.

A preferred method of producing the polymer of the outer coating is described in copending U.S. patent application Ser. No. 09/882,222.

The polymer used as the outer coating of the rubber article may be formulated with other optional ingredients, such as dispersants, surfactants, microspheres, and rheology modifiers.

Preferably the outside polymer coating contains no silicones, however the addition of a silicone to the composition can also be advantageous. A problem with having silicon compounds in the composition is that they can remain on a mold or former, making the mold or former more difficult to clean.

The polymer coating composition may also contain microspheres. Microspheres are useful in reducing the surface contact area, and thus the adhesion between the coated rubber article and the mold, former, or other object. This improves both the release and anti-blocking characteristics.

A dispersant may optionally be added to aid in dispersion of the microspheres into the aqueous polymer composition. Dispersants useful in the present invention include, but are not limited to, surfactants and polymeric dispersants including amphiphilic linear and star copolymers.

A rheology modifier is optionally present in the release composition.

The outside polymer composition may also contain other additives known in the art, such as adhesion promoters, crosslinking agents, biocides, low surface energy compounds, fillers, and antifoaming agents.

The polymer composition for the outer surface of a rubber article is made by combining each of the ingredients to form an aqueous dispersion, by means known in the art.

A preferred method of formulating the polymer of the outer coating is described in copending patent application Ser. No. 09/882,222, incorporated herein by reference.

Chlorination of the inner surface of the rubber article can be done by any means known in the art, including immersion in an aqueous chlorine solution, or a solution which will release electrophilic chlorine over time. An aqueous chlorine solution, useful in the present invention contains from 500 to 15,000 ppm of chlorine, preferably from 1,000 to 10,000 ppm of chlorine. This solution can be made using a bleach solution containing sodium hypochlorite, and adding hydrochloric acid immediately prior to use. Chlorination of gloves may occur in either an in-line or off-line process, though an in-line chlorination is preferred to reduce manufacturing steps and cost.

A process for forming any two-side treated rubber article, will be exemplified for a glove, and in particular a natural latex glove.

The process for forming a latex glove of the present invention consists of these basic steps:

a) coating a hand-shaped former with a polymer (outside) coating,
b) coating the former with a coagulant,
c) coating the former with latex,
d) chlorinating the latex (inside of glove),
e) curing the latex,
f) removing the glove from the former.

Several variations in the process are possible. In some cases, steps a) and b) can be combined into a single step, with an aqueous bath containing both the polymer and the coagulant. Still in other cases, steps d) and e) can be performed in reverse order, with chlorination following curing of the latex.

The polymeric outside coating is applied to the surface of a hand-shaped former or mold, normally by immersion of the former into a tank containing an aqueous polymer dispersion. The molds and formers may be of any material known in the art, including but not limited to ceramics, glass, and stainless steel. The polymer-coated former is then dipped into a coagulant mixture containing a latex coagulant. Useful coagulants include, but are not limited to, calcium nitrate and calcium chloride. In an alternate method, a clean former or mold is dipped into a coagulant containing a polymer composition in a single step rather than in two separate steps.

After drying, the mold coated with the polymer coating and coagulant can be used to prepare a glove by methods known in the art. For example, the coated mold is immersed in a natural or synthetic rubber latex for a time sufficient for the rubber to coagulate and form a rubber coating of the desired thickness. Optionally, the glove then may be water leached to remove impurities from the rubber. The formed glove is then oven cured, cooled, and chlorinated. Alternatively, the formed glove can be chlorinated prior to the oven cure and cooling. After cooling, the glove is simultaneously stripped from the mold and inverted. Some, or all, of the polymer coating on the glove mold or former is transferred to the what has become the outer surface of the glove.

Chlorination of a glove may also take place in an off-line process. The process involves depositing natural rubber latex on a coated former, as above. However, before the latex is cured, the former is dipped in a solution containing a release and anti-blocking aid, such as starch or calcium carbonate. The coated glove is then oven cured. After cooling, the glove is simultaneously stripped from the mold and inverted. The glove is then inverted manually and the exposed surface is chlorinated. During or after chlorination, the powdered release and anti-blocking aid can be removed. The glove is then manually inverted again so that the chlorinated surface becomes the donning side, i.e. the inside. Alternatively, if a glove is stripped automatically without inversion, the glove is directly chlorinated. This leads to a glove with a chlorinated donning side without the additional labor associated with inversion processes.

Rubber articles formed using the process of the invention include gloves, prophylactics, catheters, tires, swimming caps, balloons, tubing, and sheeting. A particularly suitable end use application is as a release composition in the production of latex gloves, including surgeons' gloves, physicians' examining gloves, and workers' gloves, more particularly powder-free latex gloves.

The following examples are presented to further illustrate and explain the present invention and should not be taken as limiting in any regard.

EXAMPLE 1

Preparation of Chlorine Water

A 6L container was charged with 5L bleach solution containing 1000 ppm sodium hypochlorite.

Right before use, the container was charged with 500 ppm hydrochloric acid.

EXAMPLE 2

Making a Latex Glove Via Online Chlorination Prior to Vulcanization

A glove is prepared by
(a) immersing a glove former in a coagulant solution containing a polymer composition having a waterborne polymer with Tg higher than −10° C. formed from at least one hydrophobic monomer, and at least one hydrophilic monomer, to produce a coated former;

(b) immersing the coated mold into a natural rubber latex to coat the former with latex;
(c) leaching the latex coated former in chlorine water from Example 1 to remove impurities from the rubber, and to chlorinate the inner surface of the glove;
(d) curing the latex in an oven; and
(e) removing the finished glove from the former.

The finished glove is treated on both sides, where the inside exhibited very good donnability and the outside exhibited good anti-blocking.

EXAMPLE 3

Making a Latex Glove Via Online Chlorination After Vulcanization

A glove is prepared by
(a) immersing a glove former in a coagulant solution containing a polymer composition having a water-borne polymer with a Tg higher than −10° C. formed from at least one hydrophobic monomer, and at least one hydrophilic monomer, to produce a coated former;
(b) immersing the coated mold into a natural rubber latex to coat the former with the latex;
(c) leaching the latex coated former in water to remove impurities from the rubber;
(d) curing the latex in an oven;
(e) immersing the latex glove into the chlorine water from Example 1; and
(f) removing the finished glove from the former.

The finished glove is treated on both sides, where the inside exhibited good donnability and the outside exhibited very good anti-blocking.

EXAMPLE 4

Making a Latex Glove Via Online Chlorination Post Vulcanization with Higher Chlorine Dose A double-side treated latex glove is made via online-chlorination as described in Example 3, except that the chlorine water used contains 3000 ppm of sodium hypochlorite and 1500 ppm hydrochloric acid. The finished glove is treated on both sides, where the inside exhibited very good donnability and the outside exhibited very good anti-blocking.

EXAMPLE 5

Making a Latex Glove Via Online Chlorination Post Vulcanization with Higher Chlorine Dose A double-side treated latex glove is made via online-chlorination described in Example 3, except that the chlorine water used contains 5000 ppm of sodium hypochlorite and 2500 ppm hydrochloric acid. The finished glove is treated on both sides, where the inside exhibited very good donnability and the outside exhibited very good anti-blocking.

EXAMPLE 6

Making a Latex Glove Via Off-Line Chlorination

A glove is prepared by
(a) immersing a glove former in a coagulant solution containing a polymer composition having a water-borne polymer with Tg higher than −10° C. formed from at least one hydrophobic monomer, and at least one hydrophilic monomer, to produce a coated former;
(b) immersing the coated mold into a natural rubber latex to coat the former with latex;
(c) curing the latex on said former in an oven;
(d) immersing the latex glove in a dispersion containing 2% starch power;
(e) removing the finished glove from the former after drying the surface;
(f) leaching the finished glove in chlorine water containing 500 ppm hypochloride and 250 ppm of hydrochloric acid, for 15 minutes with the inner surface exposed;
(g) rinsing the glove with water and drying the surface of the glove;
(h) Inversing the glove so that the chlorinated surface becomes the donning side.

The finished glove is treated on both sides, where the inside exhibits very good donnability and the outside exhibits very good anti-blocking.

What is claimed is:

1. A process for making a glove consisting essentially of:
(a) immersing a glove former in an aqueous polymer composition;
(b) immersing said glove former in a coagulant solution, to produce a coated former;
(a) immersing the coated former into a rubber latex to coat the former with said latex;
(d) chlorinating the latex on said coated former:
(e) curing the chlorinated latex on said coated former; and
(f) removing the finished glove from the former.

2. The process of claim 1 wherein steps a) and b) occur as a single step by immersing a glove former in a coagulant solution comprising said aqueous polymer composition.

3. The process of claim 1 wherein polymer comprises a water-borne polymer having a Tg of greater then −10° C. formed from at least one hydrophobic monomer, and at least one hydrophilic monomer.

4. The process of claim 1 wherein the chlorinating of the latex coated former comprises immersing amid former in a solution comprising chlorine and water.

5. The process of claim 1 wherein said aqueous chlorine solution contains from 500 to 15,000 ppm of chlorine.

6. The process of claim 5 wherein said aqueous chlorine solution contains from 1,000 to 10,000 ppm of chlorine.

7. The process of claim 1 said chlorination of the latex occurs in-line.

8. A process for making a glove consisting essentially of:
(a) immersing a glove former in an aqueous polymer composition;
(b) immersing said glove former in a coagulant solution, to produce a coated former;
(c) immersing the coated former into a rubber latex to coat the former with said latex;
(d) curing the latex on said coated former;
(e) chlorinating the latex on said coated former; and
(f) removing the finished glove from the former.

9. The process of claim 8 wherein steps a) and b) occur us a single step by immersing a glove former in a coagulant solution comprising said aqueous polymer composition.

10. The process of claim 8 wherein said polymer comprises a water-borne polymer having a Tg of greater than −10° C. formed from at least one hydrophobic monomer, and at least one hydrophilic monomer.

11. The process of claim 8 wherein the chlorinating of the latex coated former comprises immersing said former in a solution comprising chlorine and water.

12. The process or claim 8 wherein said aqueous chlorine solution contains from 500 to 15.000 ppm of chlorine.

13. The process of claim 8 wherein said chlorination of the latex occurs in-line.

* * * * *